US011809512B2

(12) United States Patent
Dey et al.

(10) Patent No.: US 11,809,512 B2
(45) Date of Patent: Nov. 7, 2023

(54) CONVERSION OF USER INTERFACE EVENTS

(71) Applicant: SAP SE, Walldorf (DE)

(72) Inventors: Satyadeep Dey, Bangalore (IN); Vinay Kumar, Bangalore (IN); Sharmika Parmar, Walldorf (DE); Sudha Karanam Narasimha Murthy, Walldorf (DE); Chandrakanth S, Walldorf (DE); Mithilesh Kumar Singh, Ara (IN); Suvajit Dutta, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/550,228

(22) Filed: Dec. 14, 2021

(65) Prior Publication Data

US 2023/0185867 A1 Jun. 15, 2023

(51) Int. Cl.
*G06F 16/958* (2019.01)
*G06F 3/0482* (2013.01)
*G06F 9/54* (2006.01)

(52) U.S. Cl.
CPC .......... *G06F 16/958* (2019.01); *G06F 3/0482* (2013.01); *G06F 9/542* (2013.01); *G06F 9/547* (2013.01)

(58) Field of Classification Search
CPC ...... G06F 16/958; G06F 3/0482; G06F 9/542; G06F 9/547
USPC ................................ 709/217, 218, 223, 224
See application file for complete search history.

(56) References Cited

U.S. PATENT DOCUMENTS

| | | | | |
|---|---|---|---|---|
| 6,473,794 B1* | 10/2002 | Guheen | ................... | H04L 43/50 709/224 |
| 6,536,037 B1* | 3/2003 | Guheen | ..................... | G06F 8/71 703/2 |
| 6,671,818 B1* | 12/2003 | Mikurak | ................. | H04L 63/08 714/48 |
| 7,013,469 B2* | 3/2006 | Smith | ....................... | G06F 3/00 719/318 |
| 7,149,698 B2* | 12/2006 | Guheen | .................. | G06Q 99/00 705/319 |
| 7,567,262 B1* | 7/2009 | Clemens | ............... | G06F 16/248 345/632 |
| 7,957,991 B2* | 6/2011 | Mikurak | .............. | G06Q 10/063 705/7.11 |

(Continued)

*Primary Examiner* — Thu Ha T Nguyen
(74) *Attorney, Agent, or Firm* — Buckley, Maschoff & Talwalkar LLC

(57) ABSTRACT

Provided are systems and methods for converting user interface events that occur in a software application developed via a WebGUI framework into activity descriptions and into a bot software program. In one example, a method may include recording events transmitted between a user interface of a web application open within a web browser on a client device and a back-end of the web application on a server, identifying codes associated with user interface elements which are assigned to the recorded events, converting the identified codes assigned to the recorded events into a human-readable descriptions of the recorded events based on a predefined mapping between the codes and the human-readable descriptions stored in the predefined mapping, and displaying the human-readable descriptions of the recorded events based on the identified order among the recorded events.

20 Claims, 9 Drawing Sheets

(56) References Cited

U.S. PATENT DOCUMENTS

| | | | | |
|---|---|---|---|---|
| 8,939,056 B1* | 1/2015 | Neal, III | | F42B 15/22 |
| | | | | 89/1.51 |
| 9,858,559 B2* | 1/2018 | Raleigh | | H04M 15/8038 |
| 10,002,034 B2* | 6/2018 | Li | | G06Q 10/10 |
| 10,474,769 B2* | 11/2019 | Williams | | E21B 7/00 |
| 2006/0184473 A1* | 8/2006 | Eder | | G06N 5/022 |
| | | | | 706/20 |
| 2007/0124362 A1* | 5/2007 | Kren | | G06F 40/205 |
| | | | | 709/202 |
| 2011/0246646 A1* | 10/2011 | Nakhjiri | | H04L 63/0823 |
| | | | | 709/224 |
| 2013/0079972 A1* | 3/2013 | Lake | | G07C 5/0808 |
| | | | | 701/31.6 |
| 2013/0080348 A1* | 3/2013 | Pantaliano | | G06Q 30/02 |
| | | | | 705/347 |
| 2013/0194066 A1* | 8/2013 | Rahman | | G05B 1/01 |
| | | | | 340/5.51 |
| 2014/0100835 A1* | 4/2014 | Majumdar | | G06Q 10/047 |
| | | | | 703/11 |
| 2014/0156084 A1* | 6/2014 | Rahman | | G16H 40/67 |
| | | | | 700/275 |
| 2014/0189104 A1* | 7/2014 | Dalton | | G06F 11/3006 |
| | | | | 709/224 |
| 2014/0206289 A1* | 7/2014 | Rahman | | H04W 4/50 |
| | | | | 455/41.2 |
| 2015/0118967 A1* | 4/2015 | Rahman | | H04W 56/001 |
| | | | | 455/41.3 |
| 2015/0207813 A1* | 7/2015 | Reybok | | H04L 63/145 |
| | | | | 726/22 |
| 2015/0371628 A1* | 12/2015 | Kreifeldt | | G10L 15/02 |
| | | | | 704/254 |
| 2017/0124669 A1* | 5/2017 | Finkel | | G06K 7/10722 |
| 2017/0140469 A1* | 5/2017 | Finkel | | G06Q 10/06393 |
| 2017/0214701 A1* | 7/2017 | Hasan | | H04L 63/1491 |
| 2018/0096309 A1* | 4/2018 | Moses | | G06F 16/24 |
| 2018/0246983 A1* | 8/2018 | Rathod | | G06F 16/9566 |
| 2018/0350180 A1* | 12/2018 | Onischuk | | G07C 13/00 |
| 2020/0260150 A1* | 8/2020 | Wong | | H04N 21/4788 |
| 2020/0402049 A1* | 12/2020 | Pi Farias | | G06Q 20/208 |
| 2022/0041184 A1* | 2/2022 | Raichelgauz | | G08G 1/0133 |
| 2022/0086179 A1* | 3/2022 | Levin | | G06F 16/285 |
| 2022/0360608 A1* | 11/2022 | Raleigh | | H04L 12/14 |
| 2022/0368696 A1* | 11/2022 | Karpovsky | | H04L 63/0236 |
| 2023/0185867 A1* | 6/2023 | Dey | | G06F 3/0482 |
| | | | | 709/217 |
| 2023/0188643 A1* | 6/2023 | Bhattacharya | | G06F 16/345 |
| | | | | 379/68 |
| 2023/0214092 A1* | 7/2023 | Burns | | H04N 21/4334 |
| | | | | 725/34 |

* cited by examiner

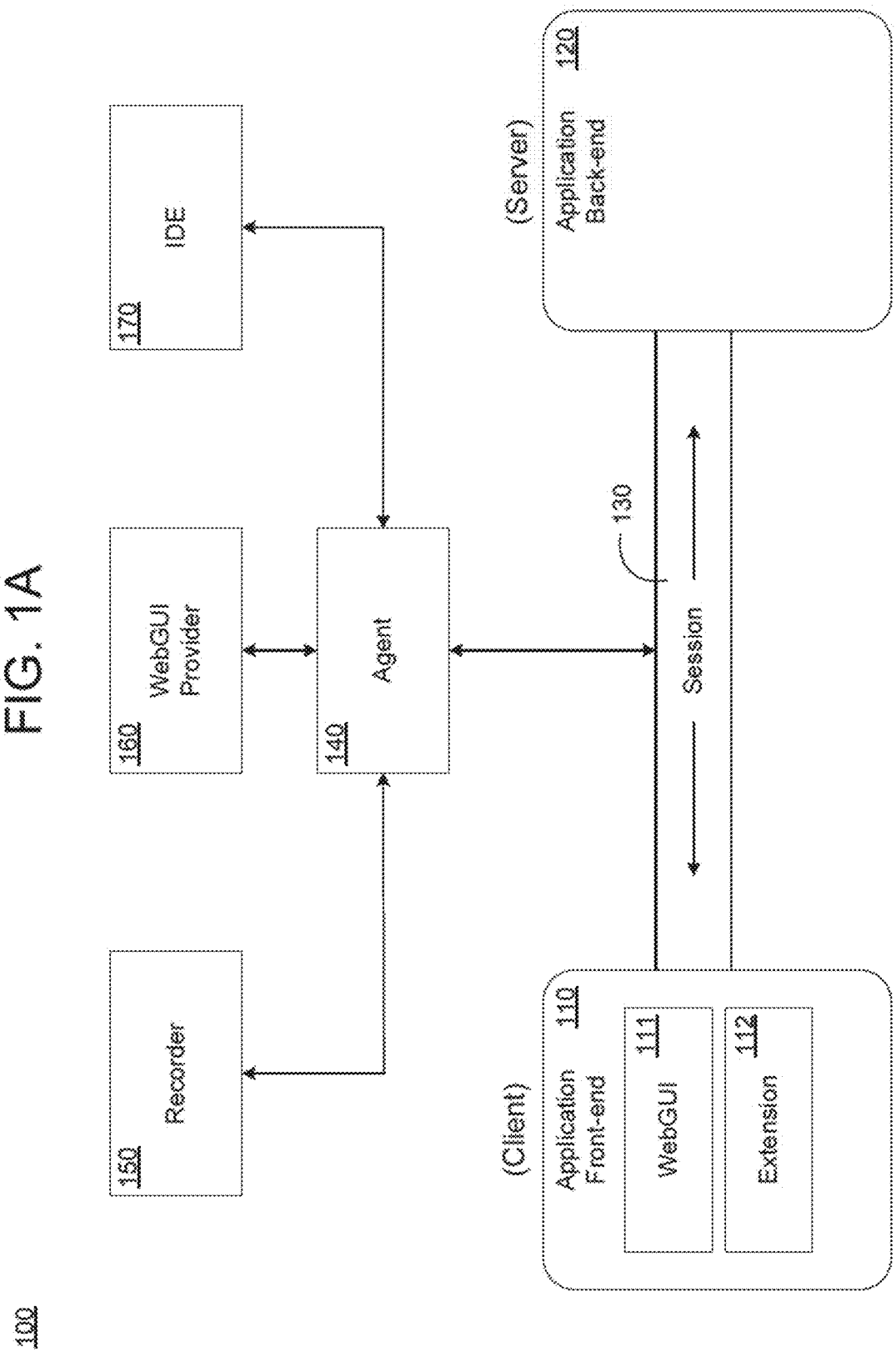

CONVERSION OF USER INTERFACE EVENTS

BACKGROUND

WebGUI, also referred to as WEBGUI and SAP GUI for hypertext markup language (HTML), is an implementation model for screen-based software applications that allows users to run dialog transactions directly in a web browser. WebGUI may dynamically provide user interfaces/screens in the web browser for transactional processing such as entering data into fields, opening pages, moving a cursor, clicking buttons, checking boxes, and the like. WebGUI relies on a client-server architecture in which a client-side or front-end of an application communicates with a server-side or back-end of the application to render content within a graphical user interface at the front-end.

Recently, robotic processing automation (RPA) has gained attention for its ability to create bot programs that can perform automated user interface actions on a user interface of a software application (e.g., a WebGUI-based application, etc.) in place of a user. For example, a bot program can automatically read data, enter the data, submit data, check boxes and buttons, make other selections, open pages, click on links, and the like. However, creating such bot programs typically requires a significant amount of manual intervention by a user.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

FIG. 1A is a diagram illustrating a computing environment for application development in accordance with an example embodiment.

DETAILED DESCRIPTION

Figure 1B:
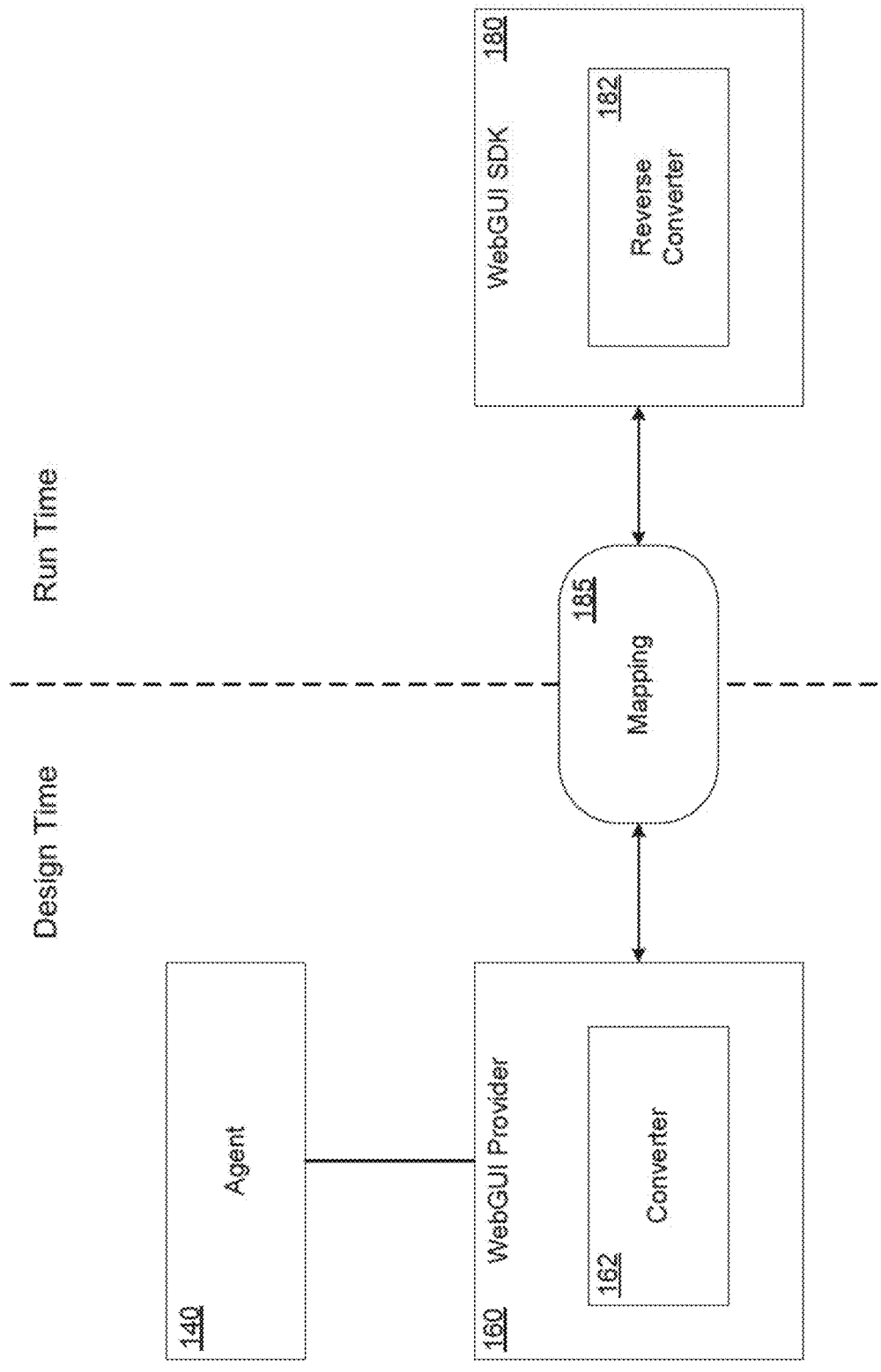
FIG. 1B is a diagram illustrating an architecture of a mapping process in accordance with an example embodiment.

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Intelligent robotic process automation uses intelligent software bots to automate repetitive manual-based processes that are performed via a computer. For example, a process of a user entering data values into fields of a user interface of a software application may be replaced with an automated bot. That is, rather than a human reading data from a source or multiple sources and entering them into fields of a user interface, a bot can be programmed to perform the same process automatically. Some of the benefits of the bot include systematizing time-consuming manual activities which significantly increase the speed at which such processes are performed. Furthermore, bots remove the possibility of human error in the data entry thereby ensuring that the data being entered is correct. Bots can open applications, click buttons, set values, close windows, etc. Furthermore, a bot can be programmed to open database tables, read values at specific locations in the tables, store values, etc.

As an example, the software application may be a WebGUI application such as an SAP GUI for HTML application. WebGUI relies on a client-server architecture in which a client-side or front-end of a software application communicates with a server-side or back-end of the software application to render content within a graphical user interface on the client-side. WebGUI is one of the Internet Transaction Server (ITS) implementation models for screen-based applications that allow users to run SAP dialog transactions directly from a Web browser, the other two models including SAP GUI for Windows and SAP GUI for Java. This model automatically maps the screen elements in SAP transactions to HTML using $\text{HTML}^{Business}$ functions implemented inside the ITS. Each $\text{HTML}^{Business}$ function handles a different screen element and uses the screen attributes to position HTML controls at the same position on the HTML page as on the system screen. With WebGUI, the user interacting with the screen needs little or no knowledge of HTML, $\text{HTML}^{Business}$, or JavaScript. Also, the user does not have to be familiar with the software development environment, because the WebGUI generates the required templates to automatically run a WebGUI application.

Here, the front-end of the application may detect user interface events and send requests for content to the back-end of the application with identifications of the detected user interface events including an ID of the user interface element where the event occurred, and a type of action (e.g., an action code) that is performed with respect to the user interface element. In response, the back-end can provide content corresponding to the detected user interface event for rendering in the user interface. For example, the content rendered by the server may include graphical user interface content such as modifications to images, buttons, data, and the like, which are visible within the user interface.

RESTGUI is a protocol that works as a bridge between a front-end of a WebGUI application (client-side) and a back-end of the WebGUI application (server-side). RESTGUI provides an interface/mechanism such as an application programming interface (API) which exposes the session between the client and the server and enables the web extension to subscribe to events at the back-end. Whenever a request comes in from the front-end of the WebGUI application, the request is sent as is to the backend. Here, the backend has an ITS layer that translates the data. The RESTGUI interface exposes a request/response mechanism between the client and the server such that the web extension can subscribe to specific events at the server and receive notifications of those events from the server. For example, the client can send a request directly to the backend with some special notations and they represent each control item with IDs, formatting, and the whole thing is readable at the server side because of this layer. In this example, the application may be displayed/posted in the web browser. The web extension is side-by-side with the web application logically.

The web extension of the example embodiments utilizes the interface provided by the REST GUI protocol to receive communications between the front-end and the back-end. The web extension may subscribe to events via the REST-GUI protocol using a window message (e.g., a Window.POST message). Here, an initial subscription tells the backend/REST GUI side to provide the web extension with the state/position data of UI controls that are interacted with by a user on the front-end of the application. Then every time a new event occurs associated with that data, the web extension is notified by the backend and the web extension may forward pass the events to a recorder widget that is hosted locally on the client-side. For example, a recording widget may be running as a desktop application/studio agent. The recording widget can record each user interface interaction on the front-end. The recording widget may also provide a window that lists the recorded events in the order they are detected.

In the example embodiments, a recorder widget can connect to a session between a front-end and a back-end of a WebGUI application, capture and record the user interface actions on the front-end of the WebGUI application and the instructions that are sent to the back-end of the WebGUI application, record the responses from the server, and build a bot based on the recorded user interface actions. Furthermore, the example embodiments may translate the technical details of the WebGUI events (e.g., actions, action codes, etc.) into activity descriptions that are understandable to a person with little or no software development experience. For example, the system described herein may translate an identifier of a user interface element and an identifier of a type of action code performed on the user interface element into a human-readable description such as "Open Page", "Set Value in Field", "Submit Data to Backend", etc.

RESTGUI is a protocol that works as a bridge between a front-end of a WebGUI application (client-side) and a back-end of the WebGUI application (server-side). RESTGUI provides an interface/mechanism such as an application programming interface (API) which exposes the session between the client and the server and enables the web extension to subscribe to events at the back-end. Whenever a request comes in from the front-end of the WebGUI application, the request is sent as is to the backend. Here, the backend has an ITS layer that translates the data. The RESTGUI interface exposes a request/response mechanism between the client and the server such that the web extension can subscribe to specific events at the server and receive notifications of those events from the server. For example, the client can send a request directly to the backend with some special notations and they represent each control item with IDs, formatting, and the whole thing is readable at the server side because of this layer. In this example, the application may be displayed/posted in the web browser. The web extension is side-by-side with the web application logically.

The web extension of the example embodiments utilizes the interface provided by the REST GUI protocol to receive communications between the front-end and the back-end. The web extension may subscribe to events via the REST-GUI protocol using a window message (e.g., a Window.POST message). Here, an initial subscription tells the backend/REST GUI side to provide the web extension with the state/position data of UI controls that are interacted with by a user on the front-end of the application. Then every time a new event occurs associated with that data, the web extension is notified by the backend and the web extension may forward pass the events to a recorder widget that is hosted locally on the client-side. For example, a recording widget may be running as a desktop application/studio agent. The recording widget can record each user interface interaction on the front-end. The recording widget may also provide a window that lists the recorded events in the order they are detected.

The recorded events can be used to build a bot that can understand the WebGUI application and automatically perform various business contexts on the user interface of the front-end of the application. WebGUI refers to the user interface that is output on the screen, while RESTGUI refers to the mechanism/interface that exposes the session between the client and the server executing the WebGUI application. In some embodiments, the user interactions may be performed on the client side, while the instructions are executed on the server-side which has the logic there. The web extension may subscribe to events for the recorder from the server-side and the server-side can send notifications of events to the recorder as they occur in real-time. For example, the web extension can connect to the session between the front-end and the back-end via RESTGUI to capture user interactions on the user interface of the WebGUI application which can be stored in a file and exported to a development environment such as an integrated development environment (IDE) where the bot can quickly and easily be built in an automated manner.

Accordingly, the example embodiments use a REST GUI service to record the interactions between the front-end and the back-end of the WebGUI application. The REST GUI service provides recognition of the individual user interface controls (e.g., unique identifier of an input field, button, drop-down, etc.) This information then gets transferred into the language of the application and used for identification. Each field has a unique ID and its stored in the backend of the WebGUI application. Here, the REST GUI service/extension may consume a window object/metadata of the WebGUI application which provides the unique identifiers to UI element mappings. In this example, there may be a mapping between UI elements and IDs, and it knows what the front-end is trying to do based on the IDs.

When a client sends a user interface request to the server, the REST GUI service follows the normal client-server relationship. The REST GUI service uses a web extension which is something that is able to utilize the session between the front-end and the back-end of the application where the web page is open. The window object where the UI is rendered may be utilized to capture and interpret the information included in the user interface requests sent to the server from the front-end of the application using the same window object. The particular page rendering is done based on the server state information. The REST GUI service may also record the content that is provided from the server to the front-end for rendering.

When a client-side of a software application sends a user interface request to the server, the REST GUI protocol follows the normal client-server relationship. The web extension may obtain and utilize content of a currently open page of the application in the session between the front-end and the back-end of the application. For example, the web extension may consume a window object (e.g., the DOM, etc.) where the user interface is rendered enabling the web extension to interpret the information included in the user interface requests sent to the server from the front-end of the application using the same window object. For example, the window object may identify user interface elements with unique IDs and also positioning information (pixel locations, etc.) of the user interface elements on the screen. The particular page rendering is done based on the server state information. The web extension then forward the events that are captured to the recorder where the events are stored for subsequent bot generation, etc.

According to various embodiments, the software described herein can convert the user interface events sent from the user interface of the WebGUI application into activity descriptions that can be understood by a non-technical user based on a mapping. That is, the example embodiments can translate or otherwise modify instructions from a front-end of the web application into human-readable descriptions that can be understood by a person without technical understanding of software development. The mapping may include actions/action codes mapped to non-technical human-readable descriptions of the actions/action codes that are more understandable to a human without technical software development experience.

FIG. 1A illustrates an example of a computing environment 100 for application development in accordance with an example embodiment. It should be appreciated that the computing environment 100 is just an example and it should also be appreciated that other elements or different elements not shown may be included in the computing environment 100. Referring to FIG. 1A, the computing environment 100 includes a software application (e.g., a WebGUI application, etc.) which includes a client-side or front-end 110 and a server-side or back-end 120 which communicate with each other via a session 130 (e.g., a web session, etc.) The session may be established via hypertext transfer protocol (HTTP) messages. In some embodiments, an authentication protocol may be performed between the front-end 110 and the back-end 120 to establish the session 130.

According to various embodiments, an agent 140 can be used to manage the recording process. Furthermore, a recorder 150 may be implemented locally on the client device and may connect to the session 130 via a web extension 112 within a browser of the client device where the front-end of the software application is running. The recorder 150 records user interactions that occur on the front-end 110 of the application and the responses from the back-end 120 of the application. In some embodiments, the requests/responses are captured via the session 130. As another example, the requests/responses can be provided from either the front-end 110 or the back-end 120.

The computing environment 100 also includes an integrated development environment (IDE) 170 that provides a complete bot development environment for creating and testing a bot. in some embodiments, the IDE 170 may be an IDE for cloud applications hosted on a cloud platform which is the server-side. In order to create a bot for automating a WebGUI application, the user first needs to capture the application from the IDE 170 and then launch the recorder 150 to record the user interactions on the user interface of the front-end 110 of the application. A WebGUI provider 160 may process the recorded user interface actions and application metadata and transform captured event information (e.g., action code, control details, position parameters, etc.) into bot-specific information (e.g., screens, activities, automation, etc. The recorder 150 may be a standard and generic recording universal recording widget that provides functionality to start recording, stop recording, export recording and view recorded step information. It also has features to undo, redo and delete steps.

Meanwhile, the agent 140 may be a hub that provides a central communication interface between the IDE 170, a WebGUI provider 160, the recorder 150, and the application (e.g., front-end 110 and the back-end 120) through a web extension 112 (e.g., CHROME® extension, etc.) The recorder 150 may be implemented via a web extension 112 that is integrated into the application itself through a WebGUI connector API. The web extension 112 may interact with the back-end 120 of the application using a WebGUI connector API 111. The recorder 150 may use the web extension 112 to capture screen shots and content, metadata, establish a connection, disconnection, record interactions, and the like. The WebGUI connector API 111 may define a common request/response j son structure and be implemented an asynchronous interface. The WebGUI connector API 111 provides an API for creating the connection, closing the connection, subscribing to events for recording, executing batch bot info, and the like. The web extension 112 may use these APIs to connect the recorder 150 to the application and subscribe to recording events and executing the automation.

In the example embodiments, the recorder 150 may utilize a "window object" where the UI is rendered and record requests to the server using the same window object. The web extension 112 is capable of utilizing the session where the page is open. The may send a request to the server using the same window object. Page rendering is done based on server state information. The server state can also be captured by the recorder. For example, the recorder may request that when a web browser opens a URL, requests to the server for this page should be recorded. Likewise, the content sent from the backend server to the front-end UI where it is rendered in the window may be recorded. The web extension 112 has the capability to sit beside the web application and have the visibility to see the window object and a document object model (DOM) via the web application. The DOM may include an API that defines the logical structure/layout of pages and documents (e.g., HTML, XML, etc.) and the way that the pages and documents are accessed and manipulated.

When a user clicks on a button via the UI on the front-end, a request is sent to the server. The server then responds with what needs to be rendered/content. The same thing happens with the recorder 150. Whenever a button is pressed on the UI, the application continues to send the request to the backend and the web extension 112 captures it and sends it to the recorder 150 via the agent 140.

The WebGUI connector API 111 used by the web extension 112 provides simple APIs for recording transactions running on WebGUI. The WebGUI connector API 111 also provides APIs for capturing the current state of the WebGUI page and position of the UI elements/controls. These two APIs allow the web extension 112 to capture both the state of the page and the position of the actions/events and forward these to the recorder 150. Using these two pieces of information, the system can also reconstruct the events and build a bot. The recording of the application page may be performed via creation of a subscription.

FIG. 1B illustrates an architecture 101 of a mapping process in accordance with an example embodiment. Referring to FIG. 1B, a mapping 185 (e.g., WebGUI mapping) may store mappings between codes included in the user interface events submitted from the front-end of the application and activity descriptions of the user interface events. The activity descriptions may include human-readable words that make sense to a user who is unfamiliar or inexperienced with software development. The mapping 185 may be designed in advance and may be used in both a design time environment and a runtime environment.

In FIG. 1B, the agent 140 receives the recorded events from the recorder 150 shown in FIG. 1A. Here, the agent 140 may provide the recorded events to the WebGUI provider 160 which implements a converter 162 function/program that can convert the recorded WebGUI events into human-readable descriptions. The converter 162 may translate or otherwise convert attributes of the WebGUI events into predefined descriptions of the actions. The converter 162 may use the mapping 185. The converted descriptions can then be displayed via a user interface in some fashion.

Meanwhile, the mapping 185 may also be used during bot creation time, or runtime. Here, a software development kit (SDK) 180 may include a reverse converter 182 function that is configured to reverse-map the human-readable activity descriptions into code that can be added into an executable software program such as a bot. That is, the reverse converter 182 can perform the reverse function of the converter 162. Here, the SDK 180 may also have access to the mapping 185.

Figure 2A:
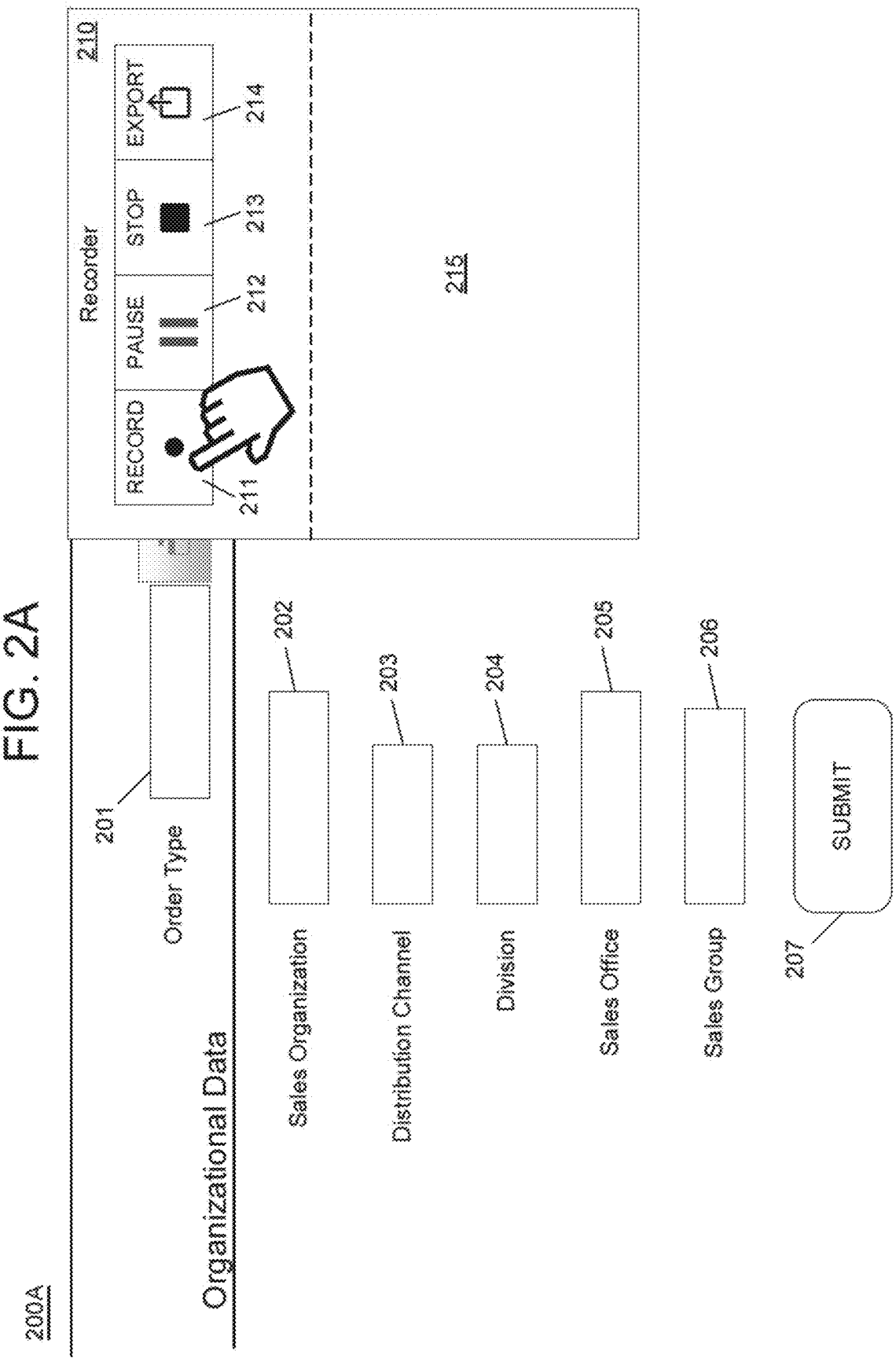
FIGS. 2A-2B are diagrams illustrating a user interface of a software application which includes a recorder window in accordance with an example embodiment.
Figure 2B:
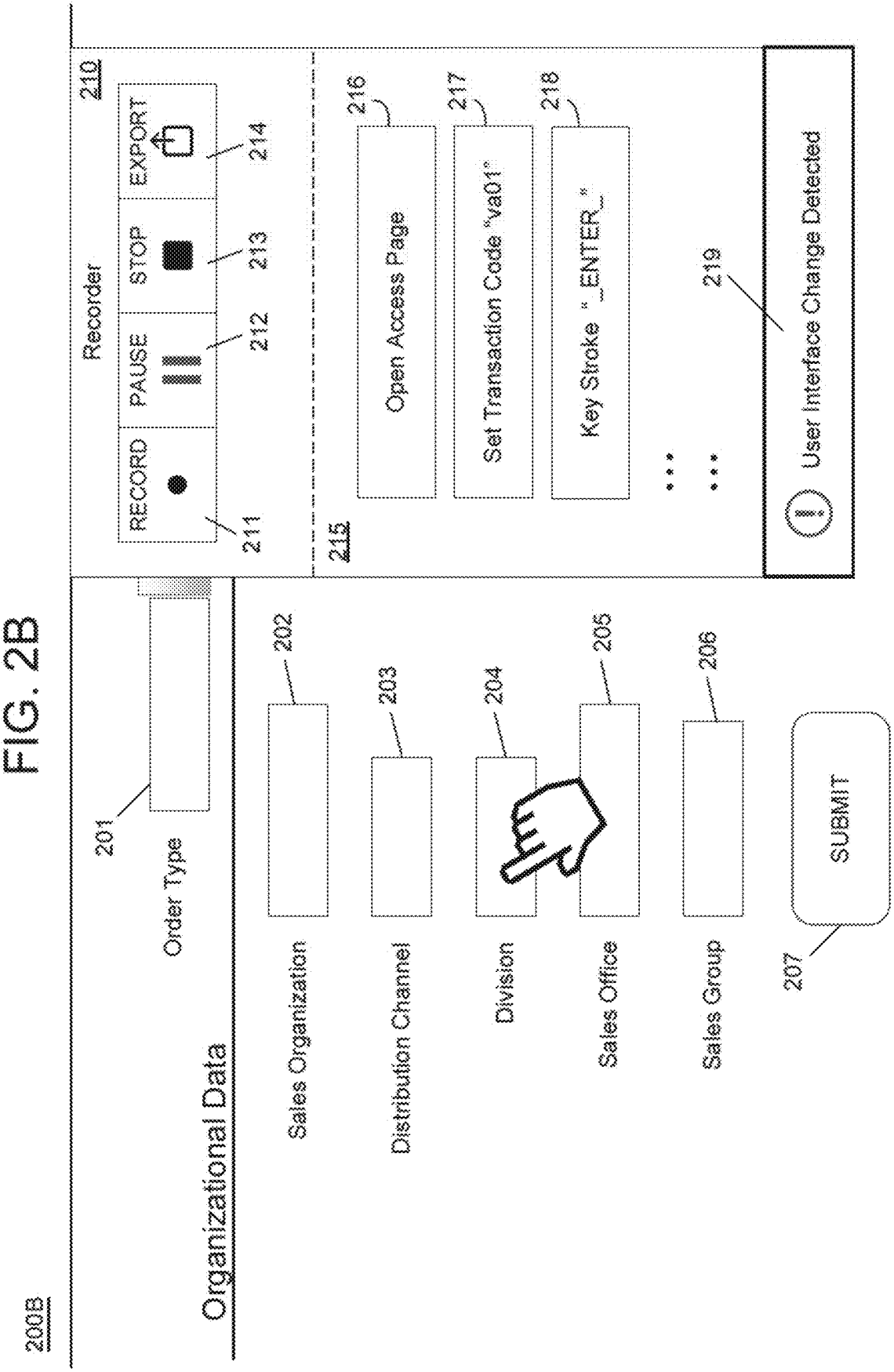

FIGS. 2A-2B illustrates a user interface (e.g., user interfaces 200A and 200B) of a WebGUI application which includes a recorder window in accordance with an example embodiment. Here, the user interface corresponds to a client-side or front-end of the WebGUI application. Referring to FIG. 2A, the WebGUI application has a user interface 200A. According to various embodiments, the user interface 200A may include various input fields, buttons, checkboxes, menus, and the like, which can be interacted with by a user using input commands such as entered via a keyboard, a mouse, a finger, or other touch mechanism. In the example of FIG. 2A, the user interface 200A includes a drop-down field 201 for entry of an order type, and fields 202, 203, 204, 205, and 206 for text entry. Each field includes an identifier/name of the data field as well as a box or other field where data can be entered. The user interface 200 also includes a submit button 207.

In this example, it can be seen that various patterns of user interface interaction can be performed by a user entering data into the user interface 200A. Each step that is performed can be recorded via the architecture shown in FIG. 1A, or the like. According to various embodiments, a window 210 with controls for the recorder may be displayed via the user interface 200A. The window 210 may be a pop-up window, an overlay, or the like, that is displayed on the user interface 200A and which provides buttons 211, 212, 213, and 214 for performing actions such as record, pause, stop, and export. In some embodiments, the window may block or hide other user interface content underneath.

When a user presses the button 211 (i.e., the record button), the recorder starts to capture and translate user interface events that are performed on the user interface 200A. For example, the window 210 may include an activity description area 215 with an area where human-readable descriptions of user interface events can be displayed/rendered.

For example, referring to FIG. 2B, the user interface 200A has changed state and is now user interface 200B. Here, the user has entered three different user interface events that have been recorded and translated. For example, each time a new event is recorded from the user interface 200A/200B, the translation of the event may be displayed in the activity description area 215 within the window 210. Here, the activity description area 215 may start off as empty and be filled with recorded events as they occur in real-time. In this example, events 216, 217, and 218 have been detected in sequence. Each time a new event is detected, a notification 219 may be displayed somewhere on the user interface 200B such as within the window 210 to notify the user that a new event has been recorded. Also, a description of the event may be translated and provided via the window 210. The events may be displayed in the order in which they are detected thereby providing the user with both a notification of the event that occurred and an order in which it occurred.

The translation process may be performed by a software application, service, program, etc., that implements the example embodiments. The translation process may involve accessing the mapping 185 shown in FIG. 1B and mapping an action code of the user interface event created by the WebGUI application into a human-readable activity description of the user interface event that makes much more sense to a human than the action code. In addition to recording explicit/express user interface events such as cursor position, input content, manipulations of buttons, fields, etc. the recorder may also detect periods of inactivity/waiting which are tracked and recorded as well. These events may be used to align timing of various actions performed by the bot. For example, execution of a second event may be delayed until completion of a first event, etc. In some cases, multiple events may be performed simultaneously and also integrated and performed by the bot simultaneously.

WebGUI Connector APIs enables the recorder to connect with the back-end, receive recording events and send request for automation. These APIs have their own responses which are not directly suitable for integration into a bot software programming environment for development of bot software. As an example, the bot software may be a robotic process automation (RPA) for programming software robots (bots) to perform a sequence of actions that involve a user interface of a WebGUI software application. Responses from WebGUI APIs are low level and mapping these to high level activities on the user interface (e.g., click button) is what makes integration with RPA possible. The mapping further includes mapping RPA activities to WebGUI requests for executing automation steps. This reverse mapping can be performed during a bot creation process.

The system described herein may be implemented in the form of a software application that is part of an RPA suite of software. The software may transform WebGUI events into high level application-level descriptions of the activities. Furthermore, the system may transform the high level activities into WebGUI's requests. Recording and automation of events created by WebGUI applications using WebGUI connector APIs differentiates the example embodiments from other RPA tools. By recording the events directly from the user interactions on the user interface, there are no risk of human errors. Furthermore, the amount of time that it takes to create a bot program can be reduced significantly because all of the steps may be automated and performed by a computer via an API connector, a recorder, and a mapping.

WebGUI events provide information about the steps performed within the WebGUI application as actions and action codes that represent a high-level user action on a specific control. It gives parameter values provided during that action on the application. The mapping is built to include a map between action codes and descriptions of activities. Below is an example of how activities and action codes are mapped. The conversion map also defines interface with SDK method name and activity names with its parameters. For example, the actions may include actions such as get, set, focus, vkey, okcode, custom, and the like.

```
"actions":
{
  "set": {
    "activityName": "Set",
    "sdkMethodName": "set",
    "classSupported": [
        "COMBOBOX",
        "EDIT",
        "CHECKBUTTON",
        "PASSWORD",
        "RADIOBUTTON",
        "COMBOCONTROL",
        "TEXT"
    ],
    "methodInputs": {
      "default" : [
        {
            "identifier": "value",
            "type": "simple",
            "typeValue": "string"
        }
      ]
    }
  }
}
```

In the example above the action "set" is mapped to various user interface elements including a combo box, an edit button, a check button, a password, a radio button, a combo control, and a text input field. The mapping may be statically built into an RPA software development environment so there is also a possibility of encountering an action event which is not known before and hence not part of the mapping. To address this situation, a generic custom activity is provided to map all such action events. This way, the system never loses any action events during recording. Later in upcoming builds these action codes may be added into the mapping and a specific activity name is seen for custom activity.

Figure 3A:
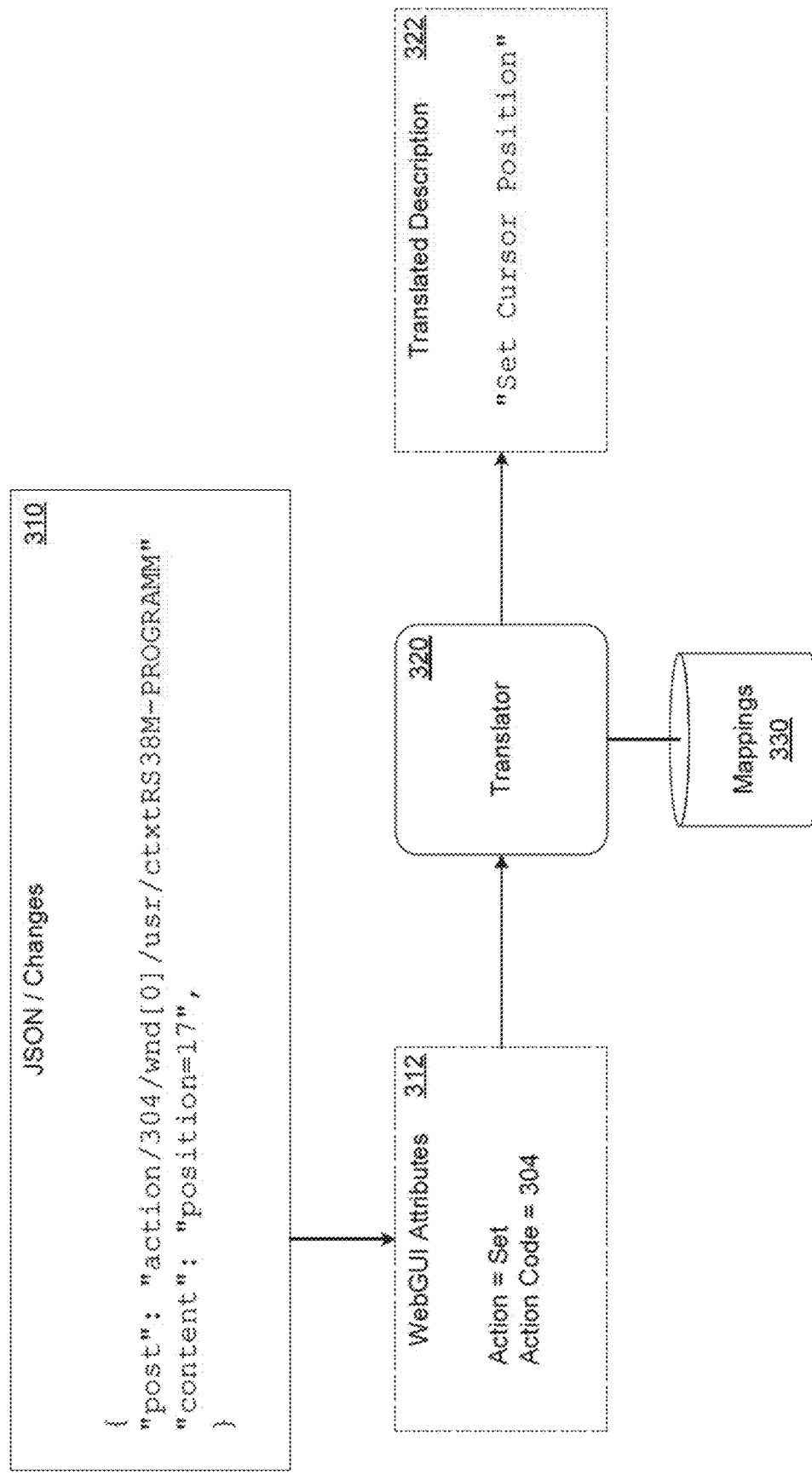
FIG. 3A is a diagram illustrating a process of converting a user interface event into an activity description in accordance with an example embodiment.
Figure 3B:
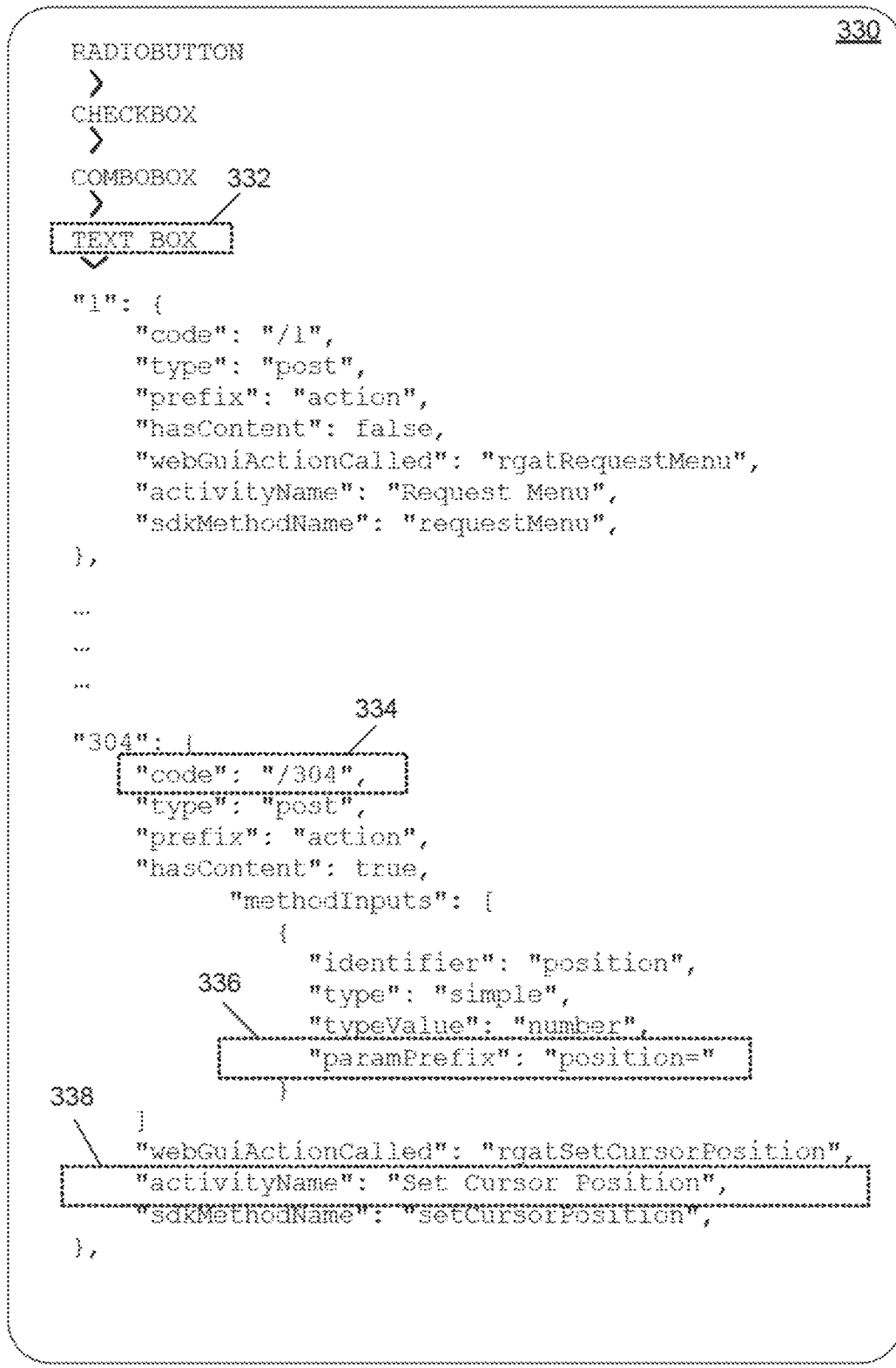
FIG. 3B is a diagram illustrating a predefined mapping for use in the converting process of FIG. 3A, in accordance with an example embodiment.

FIG. 3A illustrates a process 300 of converting an event 310 from the user interface into an activity description 322 in robotic programming code in accordance with an example embodiment. Referring to FIG. 3B, a JavaScript Object Notation (JSON) document or XML, file may be used to record the WebGUI events that are captured via the user interface/front-end of the WebGUI application. Here, the system can identify attributes 312 of the event such as an action and an action code. In this example, the action is "Set" and the action code is "304". The action and/or the action code may be used to map the event to a translated description of the event. Here, a translator 320 function, service, program, etc. may retrieve a mapping 330 from a data store and use the mappings to convert the attributes 312 into the activity description 322.

For example, FIG. 3B illustrates a non-limiting example of a mapping 330 for use in the process 300 of FIG. 3A, in accordance with an example embodiment. In this example, the mapping 330 can be used to map text content from within the event 310 into codes and then into descriptions. Here, the translator 320 may detect that this is a "set" action based on an additional command (not shown) or based on the content of the event 310. For example, in FIG. 3A, the event 310 includes an activity code "304" which can be identified by the translator 320 and mapped to a description of such activity. In this example, different types 332 of user interface elements can be mapped to the same activity code "304". Different actions may be performed for the different types 332. In this example, the type of user interface element associated with the event 310 is a text input field.

Here, the translator 320 maps the action code "304" to the same action code "304" in the mapping 330, and then identifies an attribute 334 and an attribute 336 of the event 310 to ensure that this is a valid event, and then maps the event to the description 338. The description 338 can then be output to the recorder window on the user interface such as the window 210 shown in FIGS. 2A and 2B.

Figure 4:
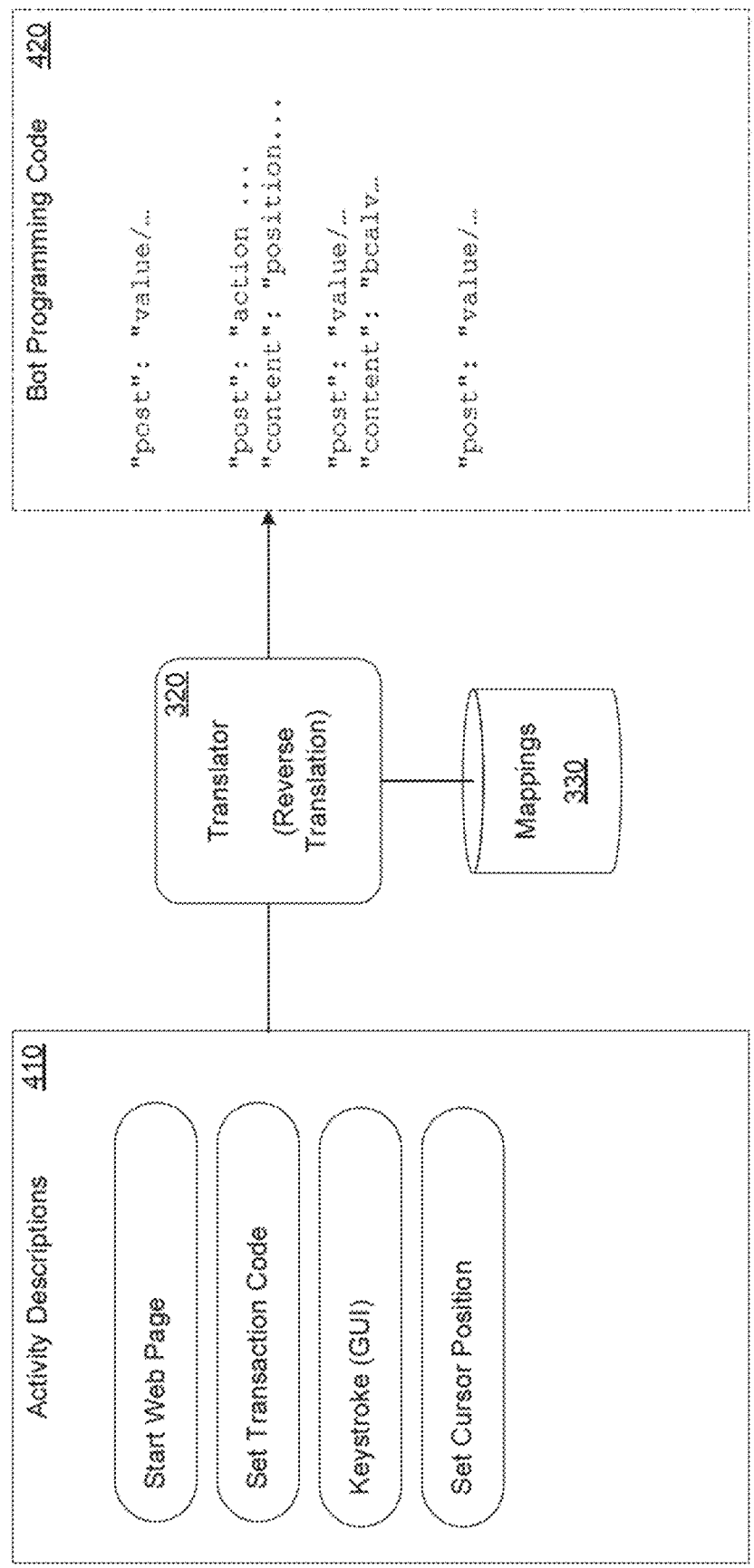
FIG. 4 is a diagram illustrating a process of converting activity descriptions into an executable bot software program in accordance with an example embodiment.

FIG. 4 illustrates a process 400 of converting a group of activity descriptions 410 into program code 420 of an executable bot software program in accordance with an example embodiment. Referring to FIG. 4, the translator 320 is configured to perform a reverse mapping based on the mapping 330 to convert the activity descriptions 410 into the program code 420 that can be executed by a bot software program to automatically perform the steps recorded via the user interface. The conversion process may be a reverse-mapping process in which the activity descriptions 410 are reverse-mapped into user interface commands capable of being understood by an IRA software application.

Figure 5:
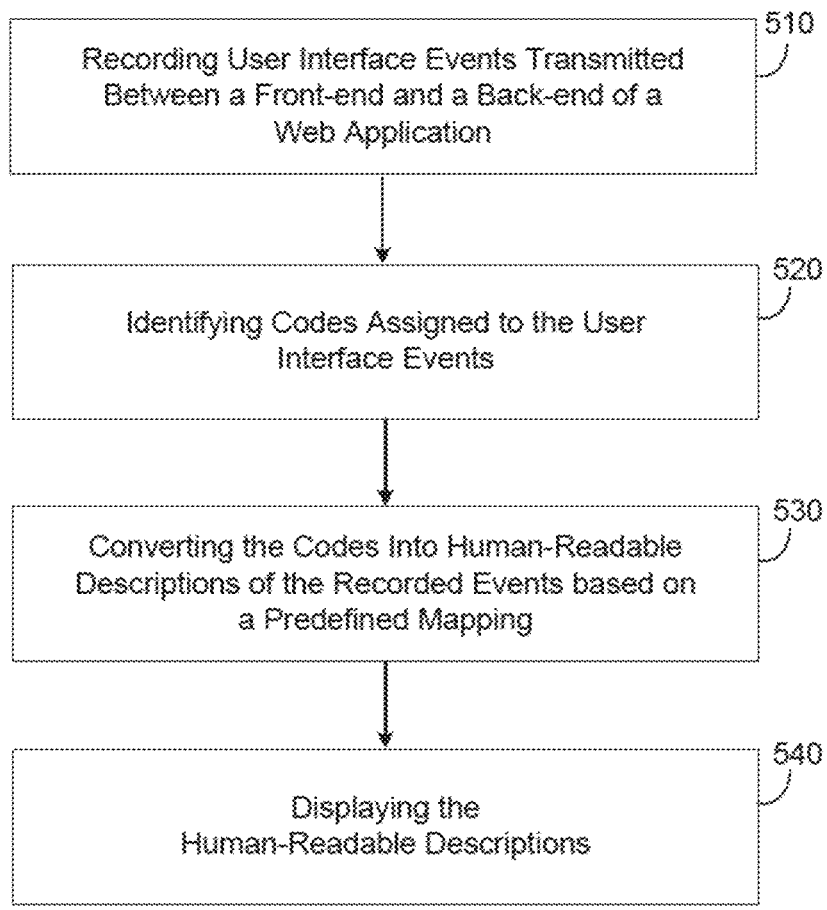
FIG. 5 is a diagram illustrating a method of converting user interface events into activity descriptions in accordance with an example embodiment.

FIG. 5 illustrates a method 500 of converting user interface events into activity descriptions in accordance with an example embodiment. As an example, the method 500 may be performed by a cloud platform, a web server, an on-premises server, a user device, a combination of devices, and the like. The method 500 may be an automated method that is performed by a software application. In other words, the commands may be predefined and issued by the software application during an automated recording process, an automated conversion process, and an automated bot generation process.

Referring to FIG. 5, in 510, the method may include recording events transmitted between a user interface of a web application open within a web browser on a client device and a back-end of the web application on a server. For example, the events may be user interface events that are created by a user interacting with various GUI elements on the screen such as text input fields, buttons, boxes, menus, content, and the like. In 520, the method may include identifying codes associated with user interface elements which are assigned to the recorded events. Each user interface event that is transmitted by the front-end and recorded by the recorded may include an identifier of the UI element that is associated with the event and a value or other type of action data related to the event for example, a content value to be entered, a position of a cursor, a value to be set, a data entry, and the like.

In 530, the method may include converting the identified codes assigned to the recorded events into a human-readable descriptions of the recorded events based on a predefined mapping between the codes and the human-readable descriptions stored in the predefined mapping In 540, the method may include displaying the human-readable descriptions of the recorded events based on the identified order among the recorded events. In some embodiments, the method may further include generating a bot program which automatically executes the recorded events based on the identified order among the recorded events.

In some embodiments, the generating may include reverse-mapping the human-readable descriptions of the recorded events into executable actions and integrating the executable actions into the bot program. In some embodiments, the identifying may include identifying a type of action and an action code of an event from the recorded events, and the converting comprises converting the event into a string of text that describes the event based on a combination of the type of action and the action code. In some embodiments, the method may further include recording the events via a web extension that accesses the events of the web application via an application programming interface (API).

In some embodiments, the method may further include identifying a recorded event that does not have a valid mapping in the predefined mapping and generating a generic text description of the recorded event that does not have the valid mapping. In some embodiments, the method may further include displaying a menu with a list of the recorded events as they occur via a user interface of the front-end of the web application where the events are being entered. In some embodiments, the method may further include starting a recorder for recording the events based on a command entered via the menu, and terminating the recorder based on another command entered via the menu.

Figure 6:
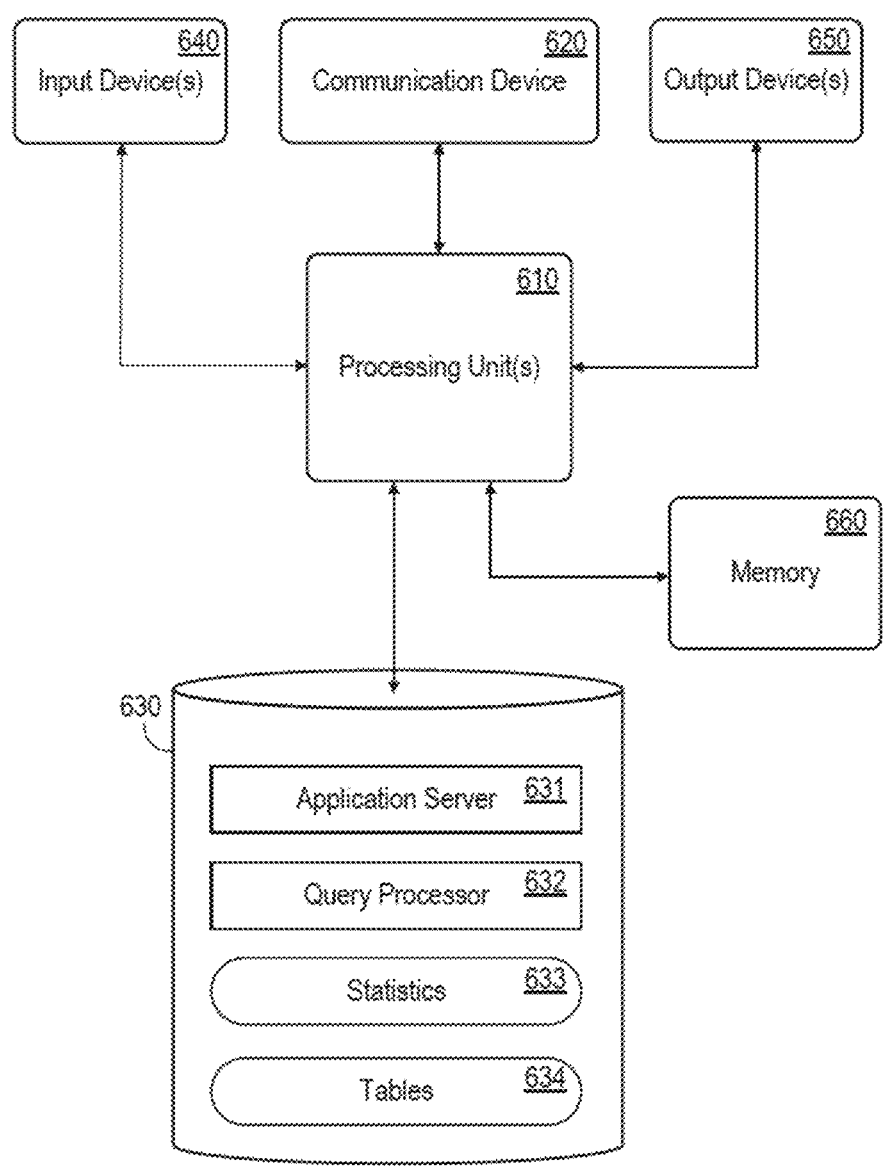
FIG. 6 is a diagram illustrating a computing system for use with any of the examples herein in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

FIG. 6 is a diagram of a server node 600 according to some embodiments. The server node 600 may include a general-purpose computing apparatus and may execute program code to perform any of the functions described herein. The server node 600 may comprise an implementation of a remote terminal or a host platform, in some embodiments. It should also be appreciated that the server node 600 may include other unshown elements according to some embodiments and may not include all of the elements shown in FIG. 6.

Server node 600 includes processing unit(s) 610 (i.e., processors) operatively coupled to communication device 620, data storage device 630, input device(s) 640, output device(s) 650, and memory 660. Communication device 620 may facilitate communication with external devices, such as an external network or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into the server node 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM). In some embodiments, the data storage device 630 may store user interface elements in tabular form. For example, one or more columns and one or more rows of user interface elements may be displayed in a two-dimensional spreadsheet, table, document, digital structure, or the like.

Application server 631 and query processor 632 may each comprise program code executed by processing unit(s) 610 to cause server node 600 to perform any one or more of the processes described herein. Such processes may include estimating selectivities of queries on tables 634 based on statistics 633. Embodiments are not limited to execution of these processes by a single computing device. Data storage device 630 may also store data and other program code for providing additional functionality and/or which are necessary for operation of server node 600, such as device drivers, operating system files, etc.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to
receive an event transmitted from a user interface of a web application open within a web browser on a client device to a back-end of the web application on a server during a session between the client device and the server, identify an action code which is assigned to the event,
convert the action code into a human-readable description of the event based on a predefined mapping between a plurality of action codes and a plurality of respective human-readable descriptions stored in the predefined mapping, and
display the human-readable description of the event on the user interface during the session between the client device and the server.

2. The computing system of claim 1, wherein the processor is further configured to receive a plurality of events transmitted from the user interface during the session, convert the plurality of events into a plurality of human-readable descriptions, and generate a bot program which automatically executes the plurality of events based on an order in which the plurality of events are received.

3. The computing system of claim 2, wherein the processor is configured to execute a reverse-mapping of the plurality of human-readable descriptions of the plurality of events into executable actions and integrate the executable actions into the bot program.

4. The computing system of claim 1, wherein the processor is further configured to identify a type of action of the event and convert the event into a string of text that describes the event based on a combination of the type of action and the action code.

5. The computing system of claim 1, wherein the processor is further configured to record the event via a web extension that accesses the web application via an application programming interface (API).

6. The computing system of claim 1, wherein the processor is further configured to receive another event, identify that the another event does not have a valid mapping in the predefined mapping, and generate a generic text description of the another event that does not have the valid mapping.

7. The computing system of claim 1, wherein the processor is configured to display a window with a list of events as they occur via the user interface of the web application.

8. The computing system of claim 7, wherein the processor is configured to start a recorder for recording the events based on a command entered via the window, and terminate the recorder based on another command entered via the window.

9. A method comprising:
receiving an event transmitted from a user interface of a web application open on a client device to a back-end of the web application on a server during a session between the client device and the server;
identifying an action code which is assigned to the event;
converting the action code into a human-readable description of the recorded event based on a predefined mapping between a plurality of action codes and a plurality of respective human-readable descriptions stored in the predefined mapping; and
displaying the human-readable description of the event on the user interface during the session between the client device and the server.

10. The method of claim 9, wherein the method further comprises receiving a plurality of events transmitted from the user interface during the session, converting the plurality of events into a plurality of human-readable descriptions, and generating a bot program which automatically executes the plurality of events based on an order in which the plurality of events are received.

11. The method of claim 10, wherein the generating comprises reverse-mapping the plurality of human-readable descriptions of the plurality of events into executable actions and integrating the executable actions into the bot program.

12. The method of claim 9, wherein the identifying comprises identifying a type of action of the event from, and the converting comprises converting the event into a string of text that describes the event based on a combination of the type of action and the action code.

13. The method of claim 9, wherein the method further comprises recording the event via a web extension that accesses the web application via an application programming interface (API).

14. The method of claim 9, wherein the method further comprises receiving another event, identifying that the another event does not have a valid mapping in the predefined mapping, and generating a generic text description of the another event that does not have the valid mapping.

15. The method of claim 9, wherein the method further comprises displaying a window with a list of events as they occur via the user interface of the web application.

16. The method of claim 15, wherein the method further comprises starting a recorder for recording the events based on a command entered via the menu, and terminating the recorder based on another command entered via the window.

17. A non-transitory computer-readable storage medium comprising instructions which when executed by a processor cause a computer to perform a method comprising:
receiving an event transmitted from a user interface of a web application open on a client device to a back-end of the web application on a server during a session between the client device and the server;
identifying an action code which is assigned to the event;
converting the action code into a human-readable description of the event based on a predefined mapping between a plurality of action codes and a plurality of respective human-readable descriptions stored in the predefined mapping; and
displaying the human-readable description of the event on the user interface during the session between the client device and the server.

18. The non-transitory computer-readable medium of claim 17, wherein the method further comprises receiving a plurality of events transmitted from the user interface during the session, converting the plurality of events into a plurality of human-readable descriptions, and generating a bot program which automatically executes the plurality of events based on an order in which the plurality of events are received.

19. The non-transitory computer-readable medium of claim 18, wherein the generating comprises reverse-mapping the plurality of human-readable descriptions of the plurality of recorded events into executable actions and integrating the executable actions into the bot program.

20. The non-transitory computer-readable medium of claim 17, wherein the identifying comprises identifying a type of action of the event, and the converting comprises converting the event into a string of text that describes the event based on a combination of the type of action and the action code.

* * * * *